(No Model.) 3 Sheets—Sheet 3.
M. H. WINSLOW.
PLATFORM SCALE.
No. 524,271. Patented Aug. 7, 1894.
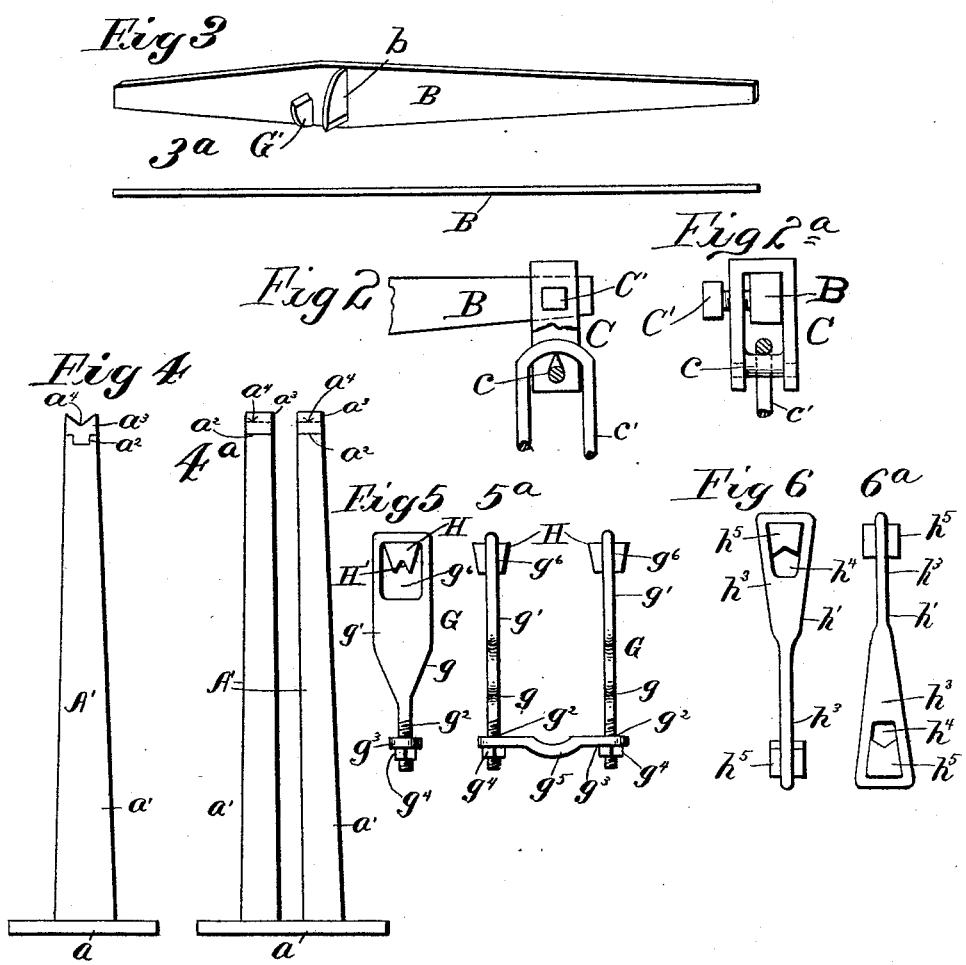

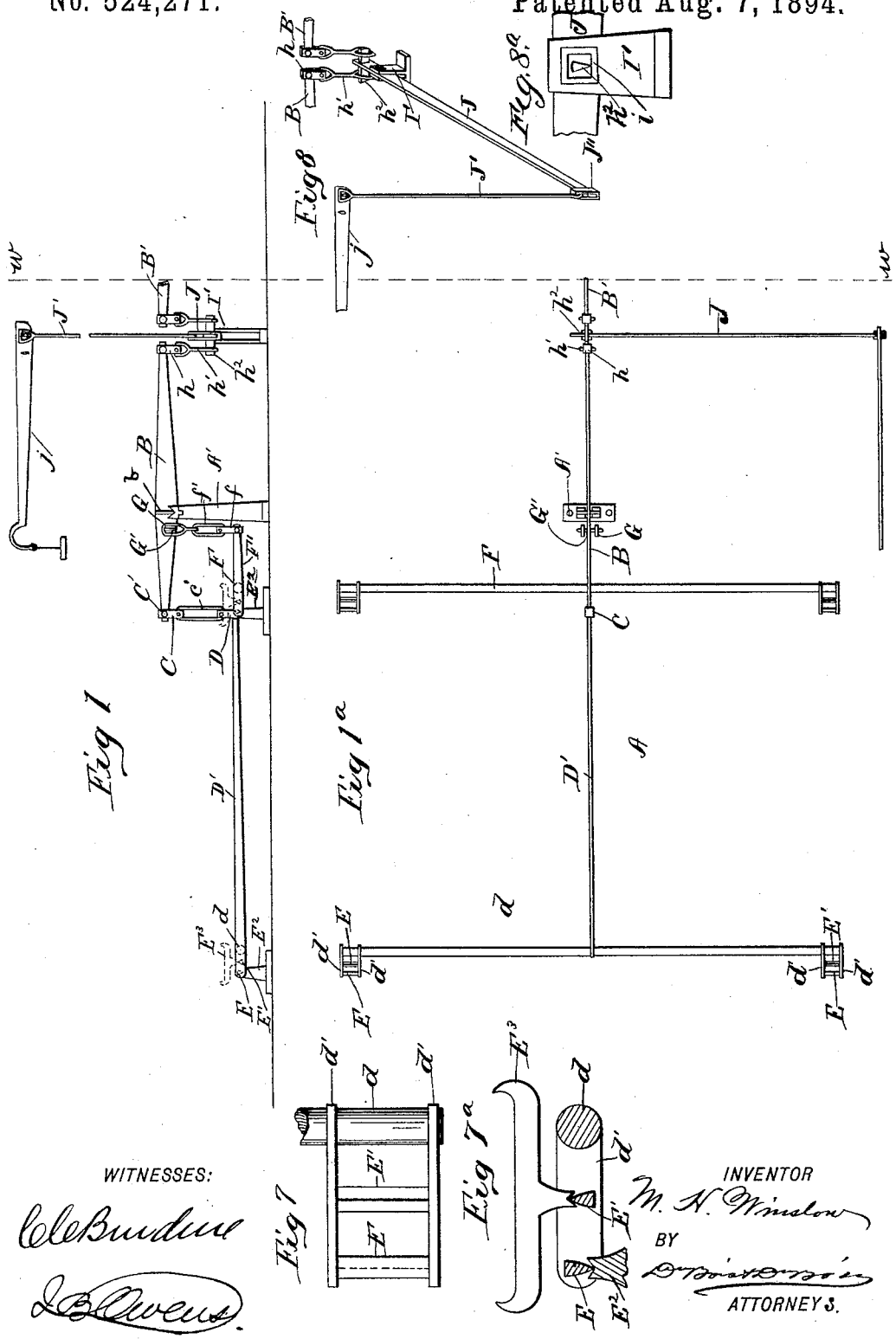

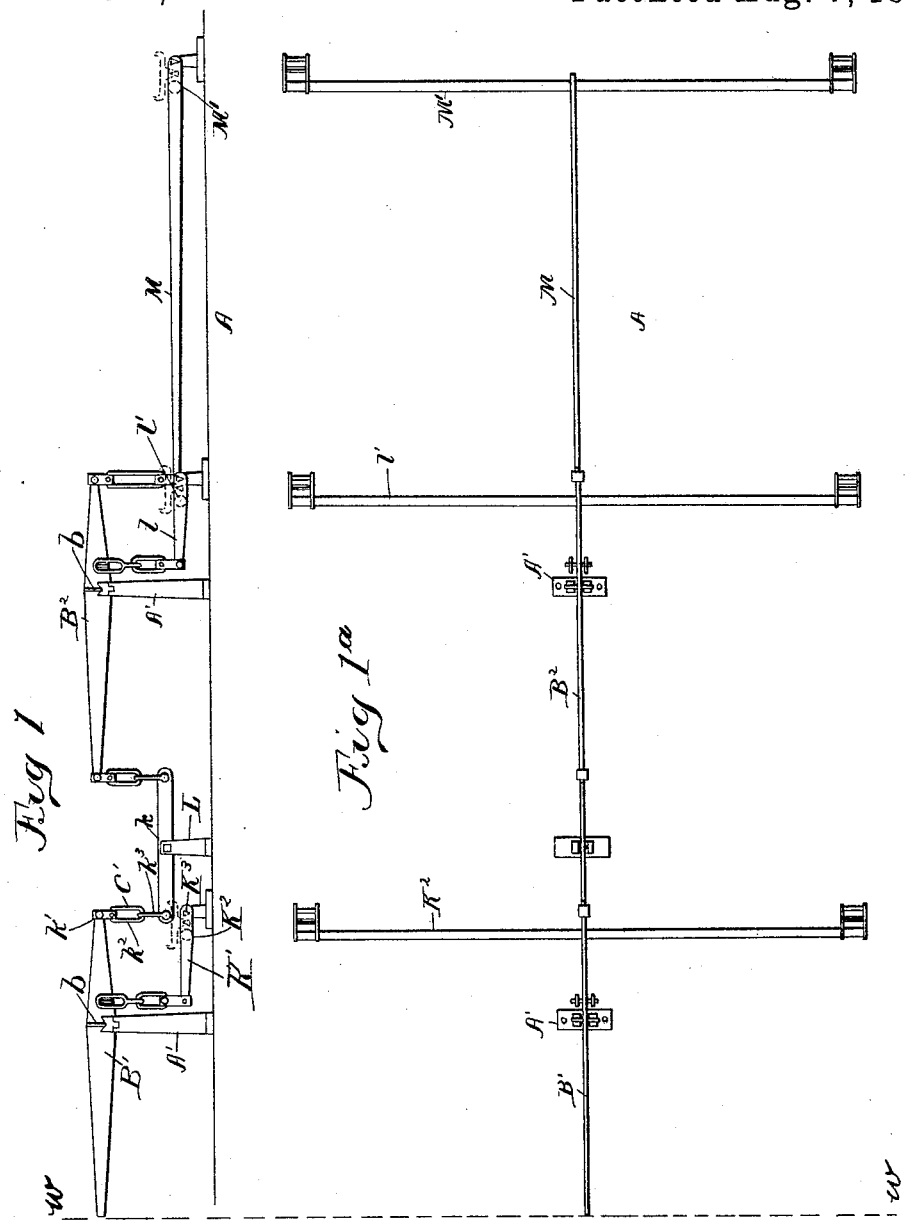

UNITED STATES PATENT OFFICE.

MARLON H. WINSLOW, OF TERRE HAUTE, INDIANA, ASSIGNOR OF TWO-THIRDS TO GEORGE LICHT AND JAMES J. KEENEY, OF SAME PLACE.

PLATFORM-SCALE.

SPECIFICATION forming part of Letters Patent No. 524,271, dated August 7, 1894.

Application filed June 1, 1893. Serial No. 476,283. (No model.)

*To all whom it may concern:*

Be it known that I, MARLON H. WINSLOW, a citizen of the United States, residing at Terre Haute, in the county of Vigo and State of Indiana, have invented certain new and useful Improvements in Platform-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in platform scales and it contemplates for its object the construction of a more durable and simple combination of levers and their connections, thereby improving the efficiency of the machine as a whole.

To this end my invention consists in certain novel features of construction and combinations and arrangement of parts all of which will now be fully described and finally embodied in the claims.

Referring to the accompanying drawings: which represent my invention in practical embodiment: Figure 1 represents a side elevation thereof showing diagrammatically the parts assembled and the scale in operative position; Fig. 1$^a$ a plan view the two Figs. 1 and 1$^a$, being each, shown partly on one sheet and partly on another, the division being made on the line W—W; Figs. 2, 2$^a$, 3, 3$^a$, 4, 4$^a$, 5, 5$^a$, 6, 6$^a$, 7, 7$^a$, 8, and 8$^a$, views of various details.

The invention is adapted primarily as a scale for use in connection with railways or a rail road scale and I will show and describe it in this relation, although it is obvious that it could be used in various other ways well-known in the art.

The reference letter A indicates the base or foundation upon which my improvements are shown as mounted. This may be of any convenient form or kind, the usual form being however, preferred.

The usual method of mounting the scale mechanism in railroad scales, consists of arranging it in a depression or excavation extending to such a depth that the platform of the scale will be on a level with the railroad track. Secured by bolts or otherwise, on the base and arising vertically therefrom, are the standards A' which are three in number and form the fulcrum or support for the scale levers B, B' and B$^2$. The standards A' are shown in detail by Figs. 4, and 4$^a$, and are formed preferably of cast steel, with a base portion or support $a$, from which the parallel standards or arms $a'$ arise vertically. These arms $a'$ are two in number and are exact duplicates of each other. Formed in the upper extremities of the arms $a'$, is a dovetail notch $a^2$ into which the chilled-steel bearing block $a^3$ is fitted by means of a dovetail tongue fitting in the notch $a^2$, and this bearing block is provided on its upper side with a triangular depression or notch $a^4$ which is designed for the reception of the knife-edges of the levers B, B' and B$^2$, as will hereinafter appear. By this means it will be seen that the bearing for the levers B, B' and B$^2$ is constructed of the hardest and best metal, while the main portion, which is not necessarily constructed of such hard metal, may be made of a cheaper kind, thereby greatly reducing the cost of manufacture.

Mounted upon each of the standards A', between their parallel arms $a'$, are the levers B, B' and B$^2$ which are formed of greater thickness and strength at their middle or fulcrum and gradually taper down as they extend or project out therefrom. Securely fastened to or formed integral with (preferably the latter) the levers B, B' and B$^2$ are the knife-edges $b$, which are two in number and project out from each side of the lever and in the same relative positions to each other. By means of these knife-edges, the levers B, B' and B$^2$ are respectively mounted upon their stands or fulcrums A', the said edges being adapted to fit into the notch $a^4$ of the chilled-block $a^3$. This forms the fulcrum for each of the levers B, B' and B$^2$ which are of the first class. Each of the levers B, B' and B$^2$ while they operate in relations generally the same, are subject to a specific mode of arrangement varying in details. This will now be described.

Arranged on the extreme end of the short arm of the lever B is a clip or nose-piece C, which fits loosely on the said end and is securely fastened in place by means of a setscrew C' working in its side and binding against the lever. The lower end of the clip C projects a small distance below the lower side of the lever and is provided thereat with a knife-edge $c$ which forms the pivot or suspending point for the link $c'$. This is shown in detail by Figs. 2 and 2$^a$. Connected to the lower end of the link $c'$ is a second clip D similar in form and arrangement to the clip C, and secured to the free end of the long lever D', which is of a length greater than that of the levers B, B' and B$^2$, and is securely bolted at its inner end to the transverse shaft $d$ at about midway the ends of the shaft.

Formed integral with each end of the shaft $d$ are the arms $d'$ which are two in number and duplicates of each other. Secured between the ends of each pair of these arms are two knife-edges E, E', the former E having its point extending downwardly and mounted on the steel block E$^2$, while the edge E' points upwardly and is adapted for the support of the scale bearings E$^3$.

Located under the lever B at a point directly below the extremity of the short arm of lever B is a second shaft F, fulcrumed by means similar to those employed in connection with shaft $d$, and having a short arm or lever F' fixed to its center and extending to the right a distance equal to the distance from the shaft F to the fulcrum pivot. Secured to the end of the lever F' is a clip $f$ similar to the clip C, and connected to the link $f'$, which in turn is connected to the clevis G, and that in its turn to the knife-edges G' of the lever B at a point but a slight distance to the left of its fulcrum $b$. The clevis G is shown in detail by Figs. 5 and 5$^a$, and it consists of the parallel side-bars $g$ formed with a broadened upper portion $g'$ and reduced screw-threaded ends $g^2$ which reduced ends are connected to each other by means of the cross-piece $g^3$ provided with openings in its ends for the reception of the ends $g^2$, nuts $g^4$ being provided for holding the parts in place; and with the indentation $g^5$ formed in its center and on its upper side, in which indentation the upper end of the link $f'$ fits.

The broadened upper portions $g'$ of the clevis G, have formed in them openings $g^6$, which are provided with the blocks H, formed of chilled-steel and having an indentation H' formed in their under sides and adapted for the reception of the knife-edges G' of the lever B. The knife-edges G' are similar in form and arrangement to the edges $b$, excepting that they are disposed upwardly as distinguished from the downward disposition of the edges $b$.

Arranged on the extreme end of the long arm of lever B is a clip $h$ similar to the clip C, and to which is connected the links $h'$, the links being in turn connected to the knife-edge $h^2$ of the cross-lever J. The link $h'$ is shown in detail by Figs. 6 and 6$^a$, and consists of a strip of metal formed integral and having two flattened portions $h^3$, the edgewise disposition of each being at right angles to the other. Formed in each flattened portion $h^3$ of the link $h'$, is an opening $h^4$ similar in form and function to the opening $g^6$ of the clevis G, and having a block $h^5$ arranged therein which co-operates, as did the blocks H, with the knife-edge of the clip $h$, and with the knife-edge $h^2$ of the lever J.

Secured on the base or foundation A is a stirrup or bearing I' having two parallel sections which embrace the lever J, and are provided with chilled-steel lined openings $i$ adapted to receive the knife-edge $h^2$ of the lever J. By this means the said lever is fulcrumed at a point near its inner end, its long arm extending out laterally and is provided with a clip J'' similar to clip C, by which it is connected to the rod J', which rod is in turn connected to the scale or weight-beam $j$ and its attending mechanism. By means of the lever J and rod J', the scale-beam is actuated as will appear fully hereinafter.

Connected to the short arm of lever J at the same point is the long arm of lever B and the long arm or lever B'. This connection is effected by means similar in every respect to those employed to effect the above mentioned connection. The lever B' is fulcrumed at a point distant from its left-hand end about two-thirds the length of the whole lever, by one of the standards A', and is connected by means herein before explained in connection with the arm F', to a short arm K' which is fixed to the shaft K$^2$, the shaft being in turn fulcrumed by means of the pivots K$^3$ similar to the pivots E and E' of the shaft $d$.

The extreme end of the short arm of lever B' is connected to the even balanced lever $k$ by means of a clip $k'$, of the class of clip C, and link $k^2$, the lower end of which link is connected to the clevis $k^3$ which is in turn connected to the lever $k$, all such connections being effected by chilled bearing blocks and knife-edges, as explained before. The balanced lever $k$ is fulcrumed to the stirrup L similar to the stirrup I', and has its remaining end connected to the long arm of lever B$^2$. This lever is similar to the levers B, B' and is fulcrumed on the standard A' and connected at a point just to the right of the fulcrum, to the short lever $l$ of the shaft $l'$, all of which is similar in construction and arrangement to the lever F and its shaft, while the extreme end of the short arm of lever B$^2$ is connected to a lever M and shaft M' which are counter parts of the lever D and shaft $d$.

The weight of the platform and its load is evenly distributed among the several shafts $d$, F, K$^2$, $l'$ and M' by means of the usual brackets E$^3$ which are provided two for each pipe and arranged to bear upon the knife-edge E' on the shaft $d$, and upon the corresponding knife-edges on the other shafts, whereby the weight of the platform and its load is applied to the shafts, from whence it is communicated by means of their arms and levers B, B' and B² to the lever I, from whence it is transferred to the scale-beam $j$, the arms and levers being so arranged that the normal weight of the platform will just balance the weight exerted by the beam $j$, as is the case with other scales of this class. The platform brackets are shown by dotted lines in Fig. 1.

I have shown and described three longitudinal levers B, B', and B², and the form of scale which they compose is adapted for use as a railway scale or where a scale of great length is desired. The essence of my invention, however, resides in the use in combination of one longitudinal lever, say for clearness the lever B, with its attending parts, namely, the shaft $d$, knife edges E and E', arm D', and the connection between the arm D' and lever B, and the lever B and the beam rod J. Following this it will be obvious that the number of these sets might be increased or decreased at will so as to form, on one hand, a scale capable of weighing a train of cars, or on the other hand, a scale adapted for only light work.

Having thus described my invention, what I claim is—

In a platform-scale, the combination with the vertical standards A' A' A' arranged in alignment and terminating at their upper ends in bearings, the main-levers B, B', B², fulcrumed on said standards, the last two of said levers having their longer ends disposed in the same direction and contrary to that of the first, the transverse shafts $d$, F, K², $l'$ and M', located as shown with reference to the standards and levers mentioned, said transverse shafts being provided respectively with the central right-angularly disposed arms D', F', K', $l$ and M, the loose connection between the free end of arm D' and the extremity of the shorter end of lever B, a similar connection with the extremity of the shorter end of lever B² and arm M, a similar connection between the free ends of arms $l$ K' and F' and intermediate points of the shorter ends of levers B², B', and B, respectively, of the bearing I' below and between the opposing longer ends of levers B and B', the lever J fulcrumed at one side of the center therein and disposed at a right-angle to the line of levers B, B', B², loose connections between the extremities of the longer opposing ends of levers B and B', the scale beam $j$, and the rod J' between the end of the same and the outer end of the lever J, substantially as specified.

In testimony whereof I affix my signature in presence of two witnesses.

MARLON H. WINSLOW.

Witnesses:
HARRY J. BAKER,
J. RUBIN.